(12) United States Patent
Xiao

(10) Patent No.: US 8,378,244 B2
(45) Date of Patent: Feb. 19, 2013

(54) PORTABLE ELECTRONIC DEVICE

(75) Inventor: Zhi-Qiang Xiao, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 289 days.

(21) Appl. No.: 12/851,752

(22) Filed: Aug. 6, 2010

(65) Prior Publication Data

US 2011/0226599 A1    Sep. 22, 2011

(30) Foreign Application Priority Data

Mar. 18, 2010    (CN) .......................... 2010 1 0127228

(51) Int. Cl.
  *H01H 13/02*    (2006.01)

(52) U.S. Cl. ...................... 200/302.2; 200/341; 200/5 A
(58) Field of Classification Search ................. 200/5 A, 200/341–345, 512–517, 302.1, 302.2, 302.3
See application file for complete search history.

(56) References Cited

U.S. PATENT DOCUMENTS

| 7,355,137 B2 * | 4/2008 | Kawasaki et al. .......... 200/302.2 |
| 2010/0258421 A1 * | 10/2010 | Chen et al. .................... 200/341 |

* cited by examiner

*Primary Examiner* — Amy Cohen Johnson
*Assistant Examiner* — Marina Fishman
(74) *Attorney, Agent, or Firm* — Altis Law Group, Inc.

(57) ABSTRACT

An exemplary portable electronic device includes a housing, a cover detachably mounted on the housing, a circuit board mounted inside the housing, a switch assembly electrically connected with the circuit board, and a key assembly secured with the cover and aligned with the switch assembly. The key assembly can be pressed by an external force to operate the switch assembly, and rebounds when released.

15 Claims, 6 Drawing Sheets

PORTABLE ELECTRONIC DEVICE

BACKGROUND

1. Technical Field

The present disclosure relates to portable electronic devices such as mobile phones, and to means for manually instructing portable electronic devices to operate.

2. Description of the Related Art

Portable electronic devices usually include a key assembly on the side of a housing. Spring units are typically used so that a pressed button returns to its original position after it is released. However, the spring unit may fail over time, causing failure of the key assembly.

Therefore, there is room for improvement within the art.

BRIEF DESCRIPTION OF THE DRAWINGS

Many aspects of the present portable electronic device can be better understood with reference to the following drawings. The components in the drawings are not necessarily drawn to scale, the emphasis instead being placed upon clearly illustrating the principles of the present portable electronic device. Moreover, in the drawings, like reference numerals designate corresponding parts throughout the several views.

DETAILED DESCRIPTION

Figure 1:
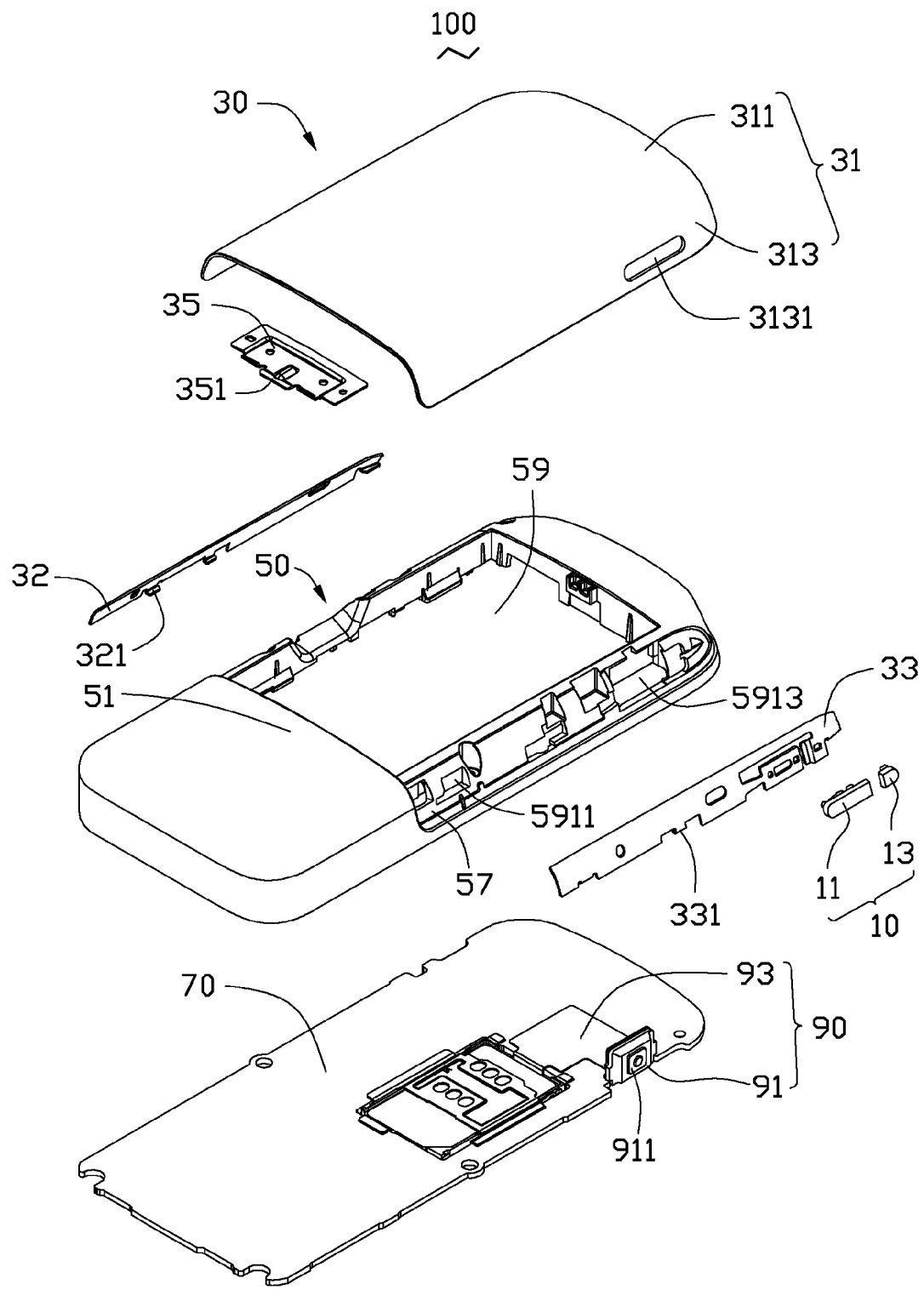
FIG. 1 is an exploded isometric view of a portable electronic device according to an exemplary embodiment.

FIG. 1 shows an exemplary embodiment of a portable electronic device 100. The portable electronic device 100 includes a key assembly 10, a cover 30, a housing 50, a circuit board 70, and a switch assembly 90. The key assembly 10 is mounted to the cover 30, and the cover 30 is mounted to the housing 50. The circuit board 70 is mounted in the housing 50, and the switch assembly 90 is mechanically and electrically mounted to the circuit board 70.

Figure 3:
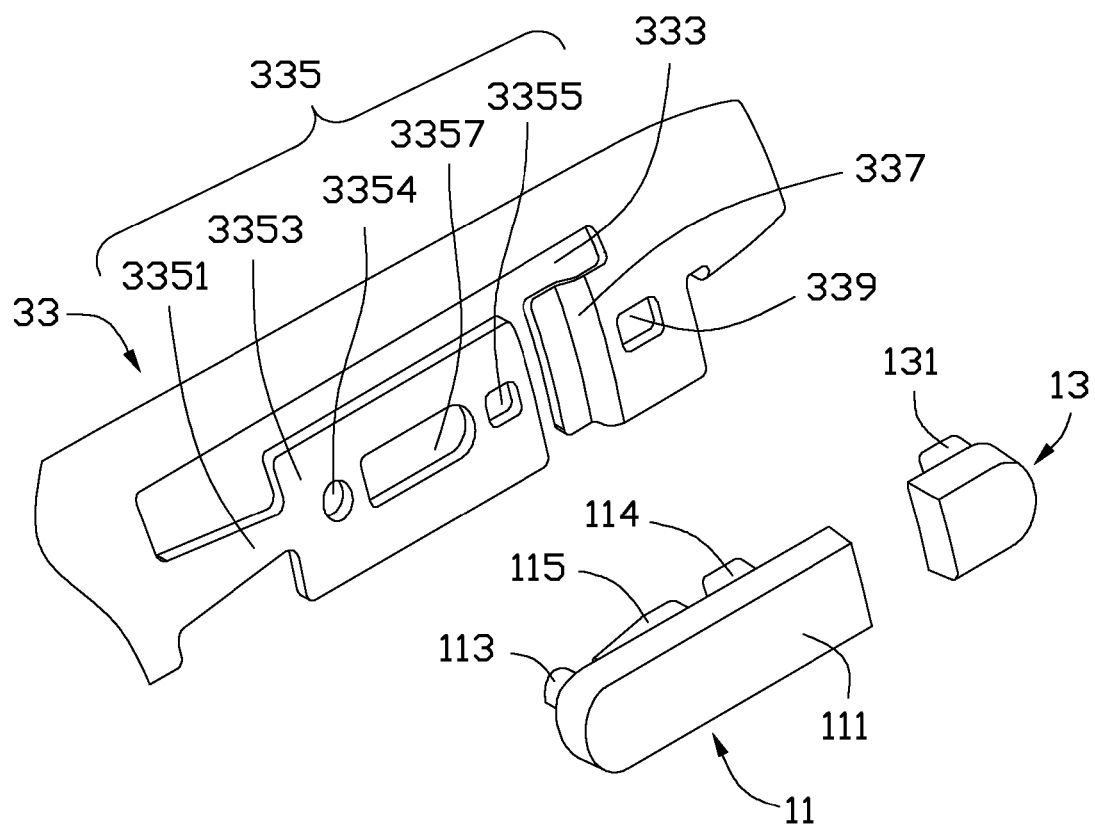
FIG. 3 is an enlarged view of a keypad assembly and a second securing frame of the portable electronic device shown in FIG. 1.

FIG. 3 shows the key assembly 10, which includes a main key 11 and a supplemental key 13. The main key 11 includes a main body 111, a first securing portion 113, a second securing portion 114, and an actuator 115. The first securing portion 113, the second securing portion 114, and the actuator 115 protrude from the same side of the main body 111. The actuator 115 is positioned between the first securing portion 113 and the second securing portion 114 for actuating the switch assembly 90. The first securing portion 113 and the second securing portion 114 cooperatively secure the main key 11 with the cover 30. The supplemental key 13 has a fixing portion 131 protruding from a main body thereof, to fix the supplemental key 13 with the cover 30.

Figure 2:
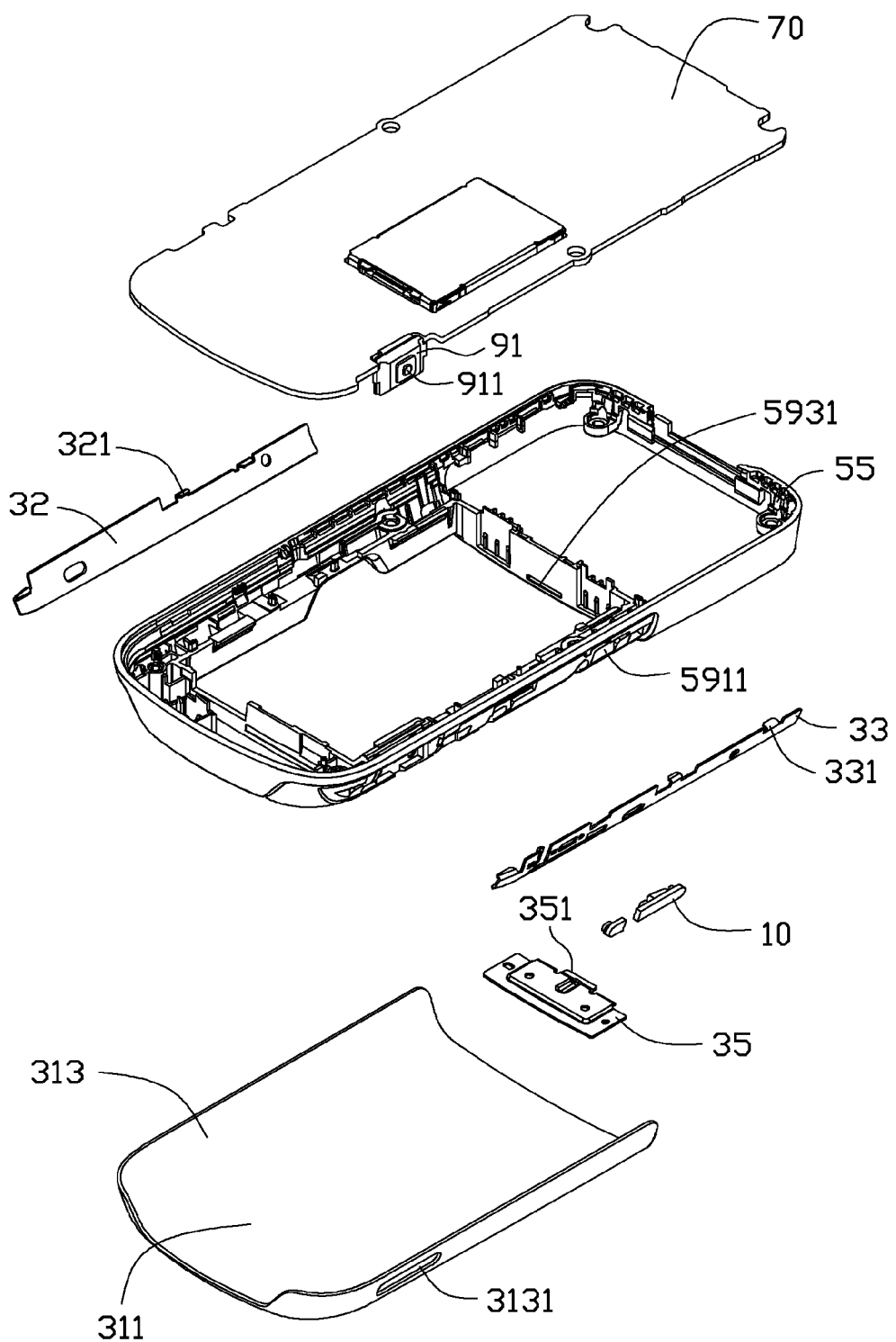
FIG. 2 is another exploded isometric view of the portable electronic device according to the exemplary embodiment, viewed from an aspect different to that of FIG. 1.

FIG. 2 shows the cover 30, which includes a cover body 31, a first securing frame 32, a second securing frame 33, and a latching member 35. The cover body 31 includes an interior wall 311 and two opposite sidewalls 313 connected to the interior wall 311. One of the sidewalls 313 defines a mounting hole 3131 for mounting the key assembly 10 therein. The first securing frame 32 and the second securing frame 33 are fixed (e.g. laser welded) to the sidewalls 313, respectively. The latching member 35 is fixed (e.g. laser welded) to an end of the interior wall 311.

Two spaced first hooks 321 laterally extend away from the first securing frame 32 (see esp. FIG. 1), and the two spaced second hooks 331 laterally extend away from the second securing frame 33 (see esp. FIG. 2). The first hooks 321 and the second hooks 331 are for hooking the cover 30 to the housing 50.

Referring to FIG. 3, the second securing frame 33 defines a through cutout 333 corresponding to the mounting hole 3131. The second securing frame 33 has an elastic arm 335 and a limiting portion 337 extending towards each other, but not connected to each other. The elastic arm 335 and the limiting portion 337 are received in the cutout 333. The elastic arm 335 includes a connecting section 3351, an arm section 3353, a first securing hole 3354, a second securing hole 3355, and a through slit 3357. The connecting section 3351 connects the arm section 3353 with the interior surface of the cutout 333. The first securing hole 3354, the second securing hole 3355, and the through slit 3357 correspond to the first securing portion 113, the second securing portion 114, and the actuator 115, respectively. The limiting portion 337 defines a fixing hole 339 for fixing the fixing portion 131 of the supplemental key 13 therein.

A latching portion 351 laterally extends from the end of the latching member 35. The latching portion 351, the first hooks 321, and the second hooks 331 cooperatively latch the cover 30 to the housing 50.

The housing 50 includes a housing body 51 and a wall 57. In the illustrated embodiment, the housing 50 is a one-piece body, with the housing body 51 and the wall 57 being portions of the one-piece body. The wall 57 encloses a battery space 59 for mounting a battery therein. The circuit board 70 abuts the wall 57 and is received in the housing body 51. The cover 30 can be detachably fixed to the wall 57 by the first and second hooks 321, 331. The wall 57 defines securing slots 5911 therethrough for securing the first hooks 321 and the second hooks 331 therein. The wall 57 further defines a receiving cavity 5913 at the same side as the securing slots 5911, for securing the switch assembly 90. The wall 57 further defines a latching slit 5931 substantially perpendicular to the securing slots 5911. The latching slit 5931 is for securing the latching portion 351.

The switch assembly 90 includes a switch 91 and a flexible printed circuit (FPC) 93. The FPC 93 electrically connects the switch 91 to the circuit board 70. The switch 91 is secured in the receiving cavity 5913 and has a resilient dome portion 911.

Figure 4:
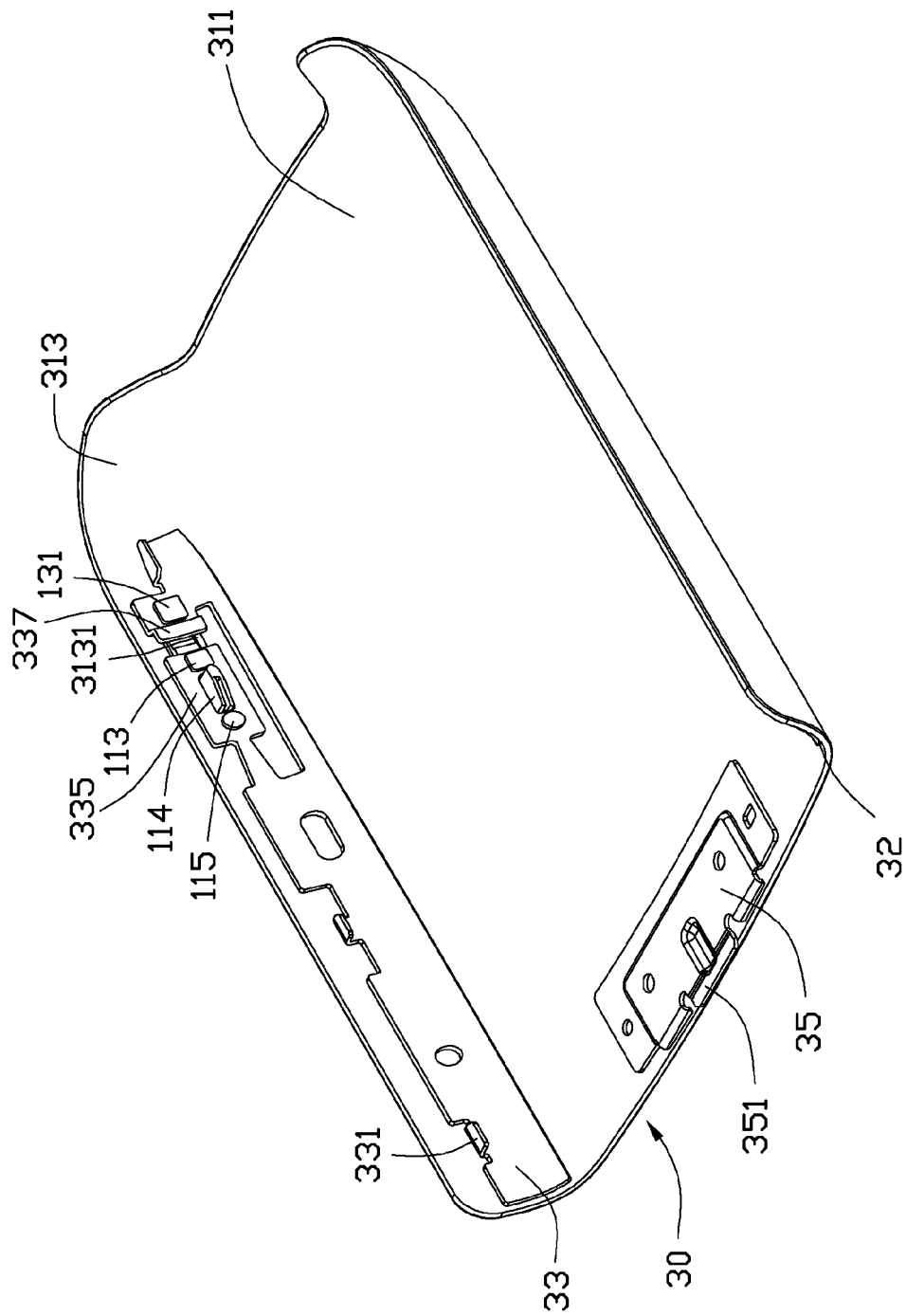
FIG. 4 is an isometric view of some parts of the portable electronic device shown in FIG. 2 assembled together, but viewed from an aspect different to that of FIG. 2.
Figure 5:
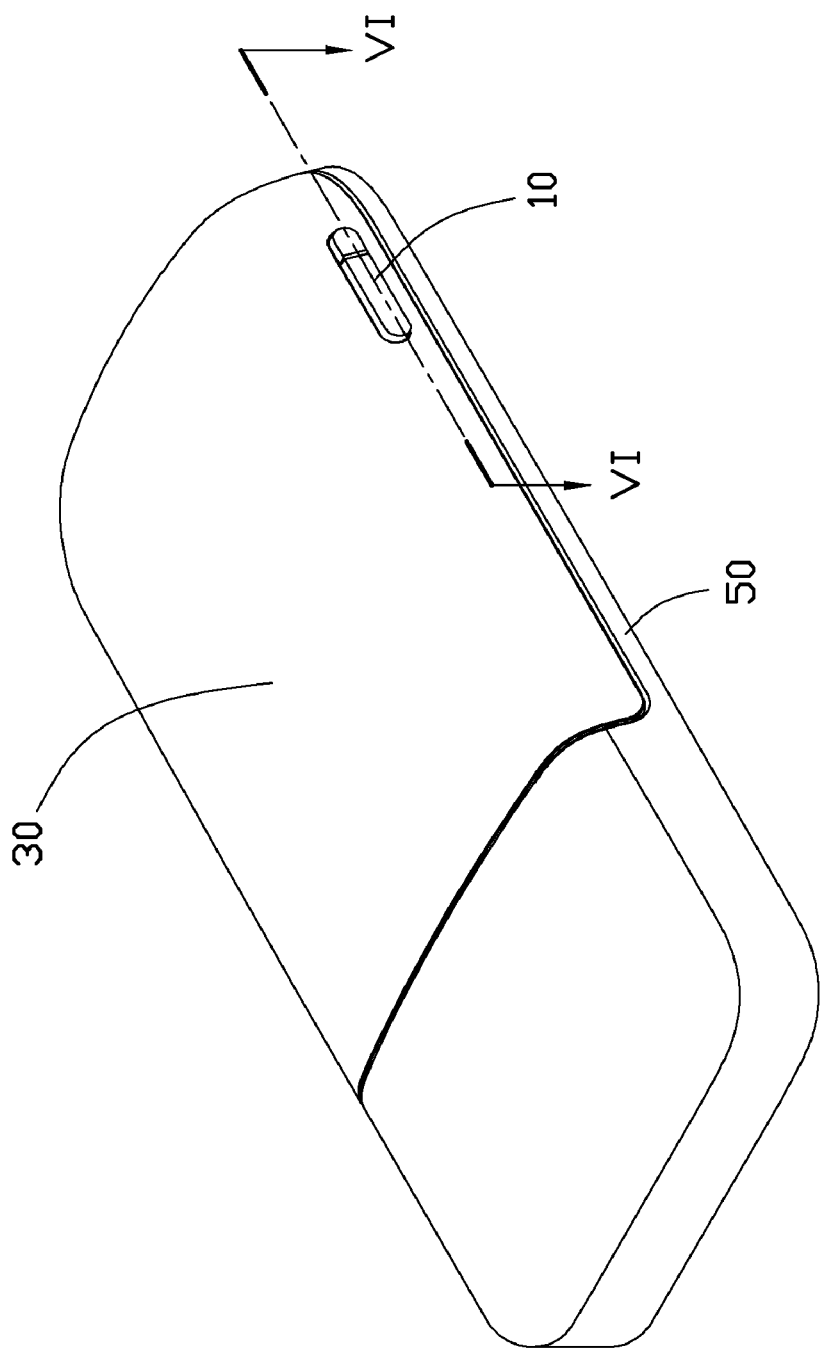
FIG. 5 is an assembled view of the portable electronic device shown in FIG. 1.
Figure 6:
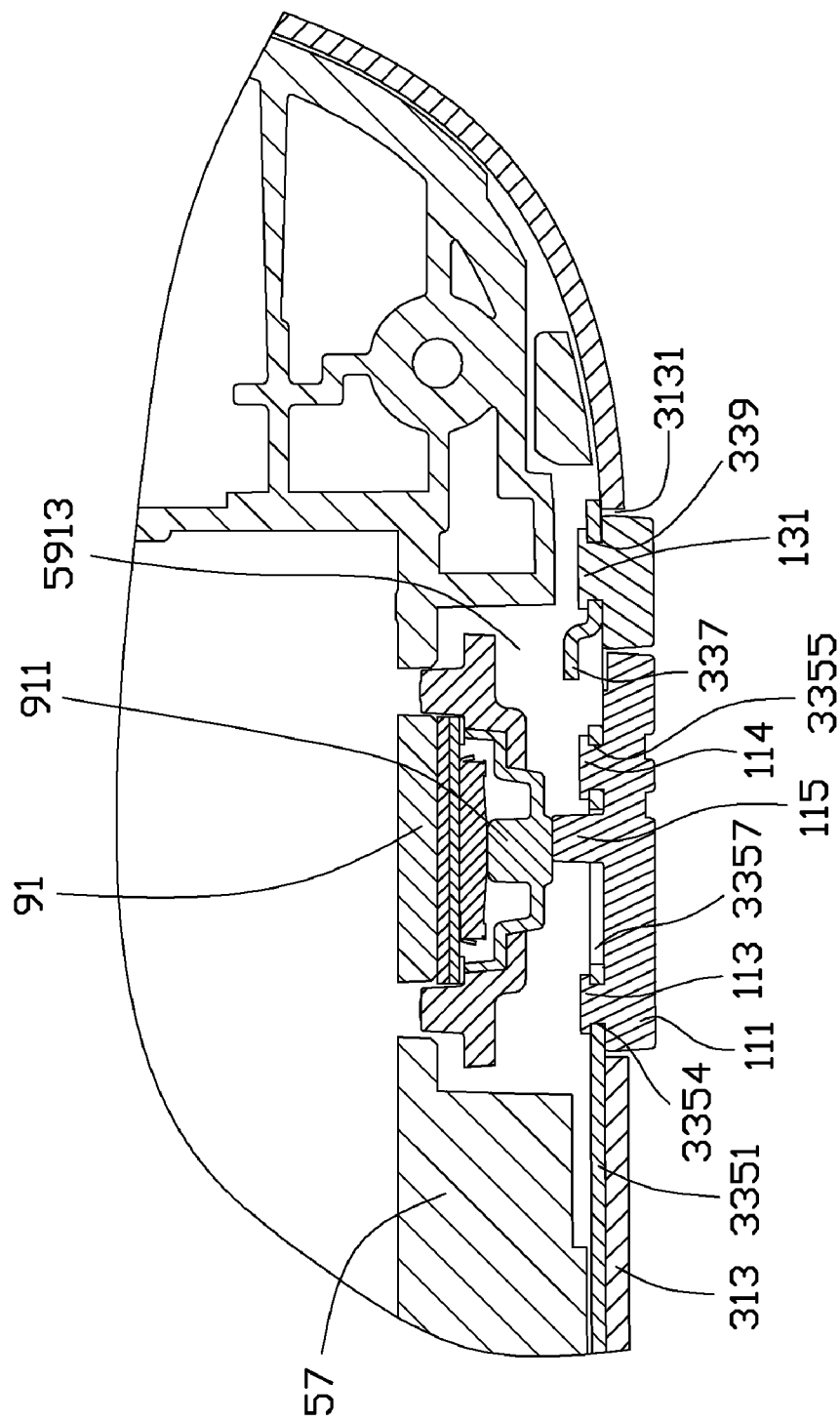
FIG. 6 is a cross-sectional view of the portable electronic device shown in FIG. 5, corresponding to line VI-VI thereof.

Referring further to FIGS. 4 through 6, after assembly of the portable electronic device 100, the switch 91 is secured in the receiving cavity 5913. The first securing frame 32, the second securing frame 33 and the latching member 35 are fixed to the cover 30. The elastic arm 335 and the limiting portion 337 align with the mounting hole 3131. The key assembly 10 is mounted to the cover 30, with the main key 11 and the supplemental key 13 received in the mounting hole 3131. The first securing portion 113, the second securing portion 114, the actuator 115 and the fixing portion 131 pass through the mounting hole 3131 into the first securing hole 3354, the second securing hole 3355, the through slit 3357, and the fixing hole 339, respectively. The first securing portion 113, the second securing portion 114, and the fixing portion 131 are secured in the first securing hole 3354, the second securing hole 3355, and the fixing hole 339, respectively, thereby securing the key assembly 10 to the cover 30. The main key 11 has an end portion overlapping the limiting portion 337. When the cover 30 is secured to the wall 57, the latching portion 351 latches in the latching slit 5931, and the first hooks 321 and the second hooks 331 engage in the securing slots 5911. The actuator 115 aligns with the dome portion 911.

In use, when the key assembly 10 is operated, the switch assembly 90 can activate a function of the device 100. In this embodiment, pressing one of the keys 11 or 13 can cause the portable electronic device 100 to capture an image. In other words, the key 11 or 13 has the function of a shutter release button. Specifically, the main key 11 is pressed inward by an external force towards the switch 91. The arm section 3353 elastically deforms and the actuator 115 moves into the receiving cavity 5913 to press the dome portion 911. The pressing of the dome portion 911 generates an actuating signal transmitted to the circuit board 70 by the FPC 93. The actuating signal drives the portable electronic device to capture an image. The limiting portion 337 can resist against and prevent the main key 11 from moving further inward and over-pressing the dome portion 911. When releasing the external force, the elastic arm 335 and the main key 11 rebound to their original states, and accordingly, the pressing of the dome portion 911 stops.

It is to be understood that even though numerous characteristics and advantages of the present embodiments have been set forth in the foregoing description, together with details of assemblies and functions of various embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A portable electronic device, comprising:
a housing, the housing defining a receiving cavity;
a cover detachably mounted on the housing, the cover comprising a securing frame, the securing frame comprising an elastic arm;
a circuit board mounted inside the housing;
a switch assembly electrically connected with the circuit board, mounted in the receiving cavity, and partially exposed to the outside of the housing; and
a key assembly, the key assembly comprising a main key secured to the elastic arm and aligned with the switch assembly, wherein the key assembly can be pressed by an external force to operate the switch assembly, and the key assembly rebounds when the external force is released; when the main key is pressed by the external force towards the switch assembly, the elastic arm deforms and the main key moves into the receiving cavity to press the switch assembly.

2. The portable electronic device as claimed in claim 1, wherein the key assembly is bendable into and out from the receiving cavity.

3. The portable electronic device as claimed in claim 1, wherein the main key is aligned with the switch assembly.

4. The portable electronic device as claimed in claim 3, wherein:
the switch assembly comprises a switch and a flexible printed circuit, the flexible printed circuit electrically connecting the switch and the circuit board; and
the switch received in the receiving cavity, and the main key aligned with the switch.

5. The portable electronic device as claimed in claim 4, wherein:
the switch comprises a resilient dome portion;
the main key comprises an actuator aligned with the dome portion; and
when the main key is pressed by the external force towards the switch, the actuator moves into the receiving cavity to press the dome portion.

6. The portable electronic device as claimed in claim 5, wherein:
the main key further comprises a first securing portion and a second securing portion, and the actuator is positioned between the first securing portion and the second securing portion; and
the securing frame defines a first securing hole, a second securing hole, and a through slit, the first securing portion and the second securing portion are secured in the first securing hole and the second securing hole, respectively, and the actuator extends through the through slit.

7. The portable electronic device as claimed in claim 1, wherein the securing frame further comprises a limiting portion adjacent to and separated from the elastic arm, and the key assembly further comprises a supplemental key secured to the limiting portion.

8. A portable electronic device, comprising:
a housing;
a cover configured to be manually attached to and detached from the housing;
a circuit board mounted inside the housing;
a switch assembly electrically connected with the circuit board and mounted inside the housing; and
a key assembly secured with the cover, wherein when the cover is attached to the housing, the key assembly can be moved into the housing to resist against the switch assembly with a portion of the cover adjoining the key assembly simultaneously elastically deforming, and the deformed portion of the cover can subsequently rebound and return the key assembly to its position prior to the movement.

9. The portable electronic device as claimed in claim 8, wherein the key assembly comprises a main key securing with the cover and aligned with the switch assembly.

10. The portable electronic device as claimed in claim 9, wherein:
the switch assembly comprises a switch and a flexible printed circuit, the flexible printed circuit electrically connecting the switch and the circuit board; and
the housing defines a receiving cavity, the switch received in the receiving cavity, the main key aligned with the switch.

11. The portable electronic device as claimed in claim 10, wherein:
the switch comprises a resilient dome portion; and
the main key comprises an actuator aligned with the dome portion, when the main key is pressed by an external force towards the switch, the actuator moves into the receiving cavity to press the dome portion.

12. The portable electronic device as claimed in claim 11, wherein the cover comprises a securing frame, the securing frame comprises an elastic arm, the main key is secured to the elastic arm, when the main key is pressed by an external force towards the switch, the elastic arm deforms and the actuator moves into the receiving cavity.

13. The portable electronic device as claimed in claim 11, wherein the securing frame further comprises a limiting portion adjacent to and separated from the elastic arm, and the key assembly further comprises a supplemental key secured to the limiting portion.

14. The portable electronic device as claimed in claim 8, wherein:

the cover comprises a cover body, a first securing frame, a second securing frame and a latching member, the first securing frame opposite to the second securing frame; and the housing comprises a housing body and a wall connecting the housing body, the first securing frame, a second securing frame and the latching member secured with the wall.

15. A portable electronic device, comprising:

a housing;

a cover attachable to and detachable from the housing;

a circuit board mounted inside the housing;

a switch assembly mounted inside the housing and electrically connected with the circuit board; and a key assembly secured with an elastically deformable portion of the cover, wherein when the cover is attached to the housing, the key assembly is in a ready position in which it can be pressed by a user to move into the housing and activate the switch assembly and simultaneously deform the deformable portion of the cover, and then when the pressing is stopped the deformed portion of the cover can rebound and return the key assembly to the ready position.

\* \* \* \* \*